G. MATHESON.
JOINTS AND COUPLINGS FOR TUBES.

No. 171,234. Patented Dec. 21, 1875.

UNITED STATES PATENT OFFICE.

GEORGE MATHESON, OF McKEESPORT, PENNSYLVANIA.

IMPROVEMENT IN JOINTS AND COUPLINGS FOR TUBES.

Specification forming part of Letters Patent No. 171,234, dated December 21, 1875; application filed September 20, 1875.

*To all whom it may concern:*

Be it known that I, GEORGE MATHESON, of McKeesport, in the county of Allegheny and State of Pennsylvania, have invented a new and useful Improvement in Joints and Couplings for Tubes; and I do hereby declare that the following is a full and exact description thereof, reference being had to the accompanying drawing and to the letters of reference marked thereon.

My invention relates to an improvement in the construction of the joints and couplings for tubes, and consists in the peculiar form of the joint, to wit: Enlarging the diameter of one end of the tube so that the end of another tube of the same size and kind will enter the enlarged end, and so that the outer edge of the end of the entering-tube will conform to and impinge upon the inner wall of the enlargement, so as to form a close joint of "iron and iron."

My invention also consists in so constructing the coupling that it can be uncoupled by a slight turn of the nuts upon their bolts, and the bolts removed from the lugs, (which constitute part of said coupling,) without the necessity of removing the nuts from said bolts.

To enable others skilled in the art to make and use my invention I will proceed to describe its construction and operation.

Figure 1:
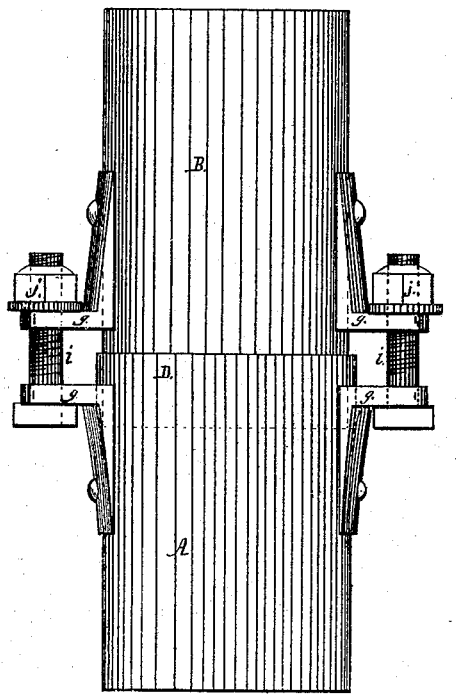
Figure 2:
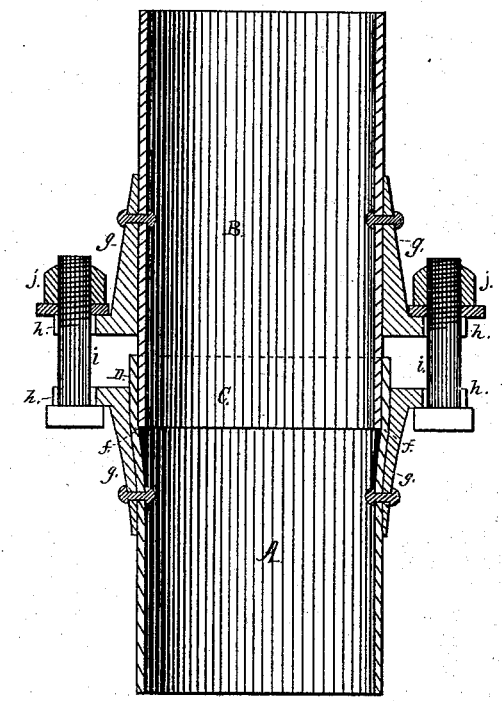

In the accompanying drawing, which forms part of my specification, Figure 1 is a side elevation of sections of two tubes furnished with my improved joint and coupling therefor. Fig. 2 is a vertical and longitudinal section of the same.

In the accompanying drawings, A and B represent sections of two tubes. The end C of the tube A is enlarged by heating, and then forcing into its bore a mandrel of the size and form desired, which form is clearly indicated in Fig. 2 of the accompanying drawing. The entering end C of tube B is cut at right angle to the longitudinal axis of the tube, so that the edge *f* will, at points of its circumference, bear equally on the inner wall of the enlarged end of the tube A, so that when the end C of the tube B is forced into the enlarged end D of the tube A, the edge *f* of the end C of the tube B will conform to the contour of the inner wall of the end D of the tube A, and impinge upon it, and be so embedded that a perfect joint of iron and iron will be formed, which will not be liable to leak when subjected to great internal pressure. The lugs *g* are each provided with a slot, as indicated at *h*, for the reception of the bolts *i* and screw-nuts *j*.

The lugs *g*, bolts *i*, and screw-nuts *j* constitute my improved coupling for tubes, the essential feature of said coupling being the slot *h*, whereby the bolts *i* can be removed by a slight turning of the screw-nuts *j*, and without the necessity of removing it from its bolt in the act of uncoupling, whereby facility of coupling and uncoupling the tubes is accomplished without liability of losing the screw-nuts from off their bolts.

The advantage of uncoupling and coupling tubing with ease, speed, and facility, and the manner of forming joints herein described, will be readily understood by miners and those employed in furnishing pipe for mines, it often being necessary to lay tubes for conveying water a distance of several miles.

Having thus described my invention, what I claim is—

1. As an improvement in joints and couplings for tubes, the tube A, enlarged so as to receive the tube B, as hereinbefore described, in combination with the slotted lugs *g*, bolts *i*, and screw-nuts *j*, substantially as described and set forth.

2. The combination of the slotted lugs *g*, bolts *i*, and screw-nuts *j*, with the tubes A and B, substantially as herein described, and for the purpose set forth.

GEORGE MATHESON.

Witnesses:
A. C. JOHNSTON,
A. MILLAR.